UNITED STATES PATENT OFFICE.

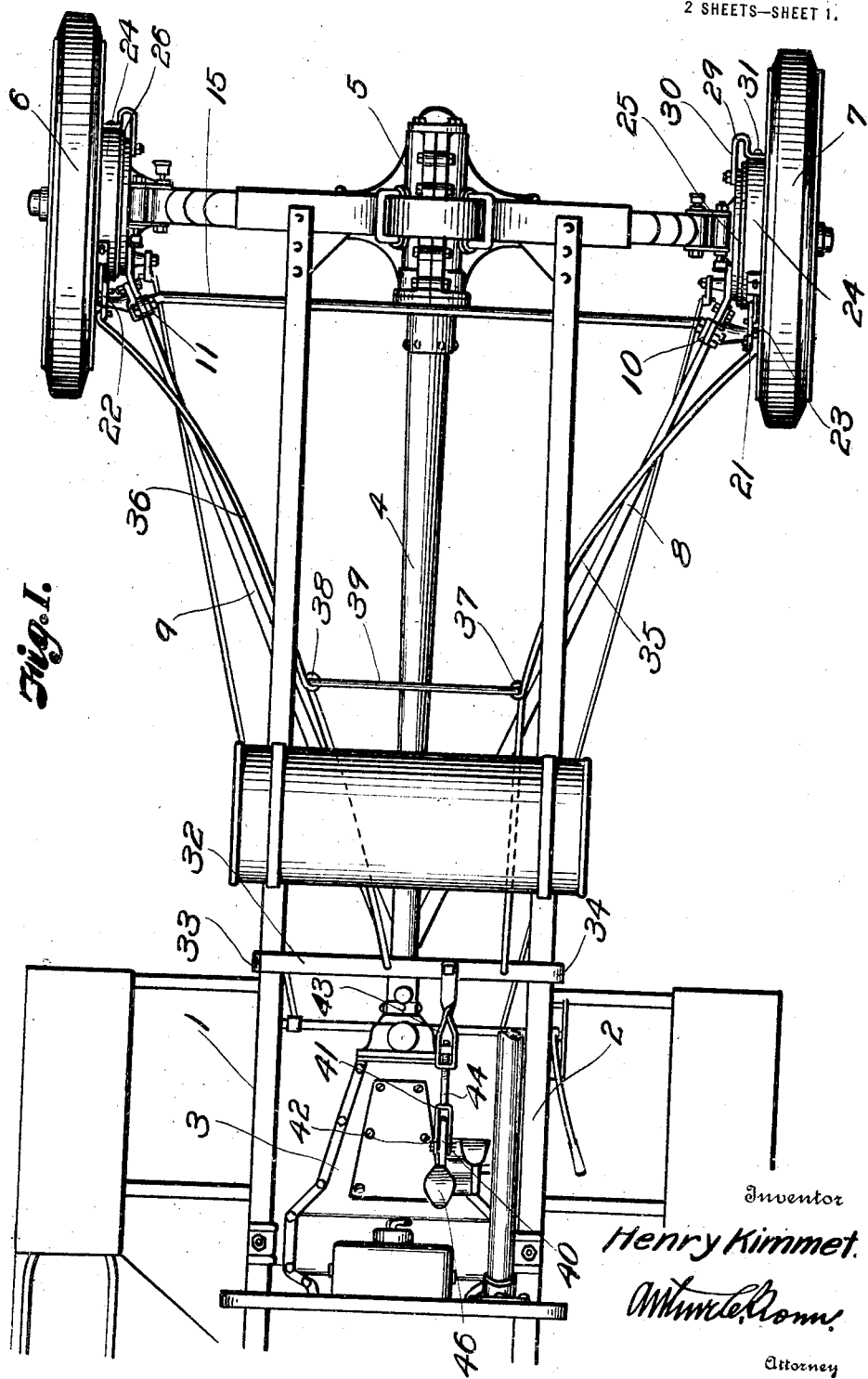

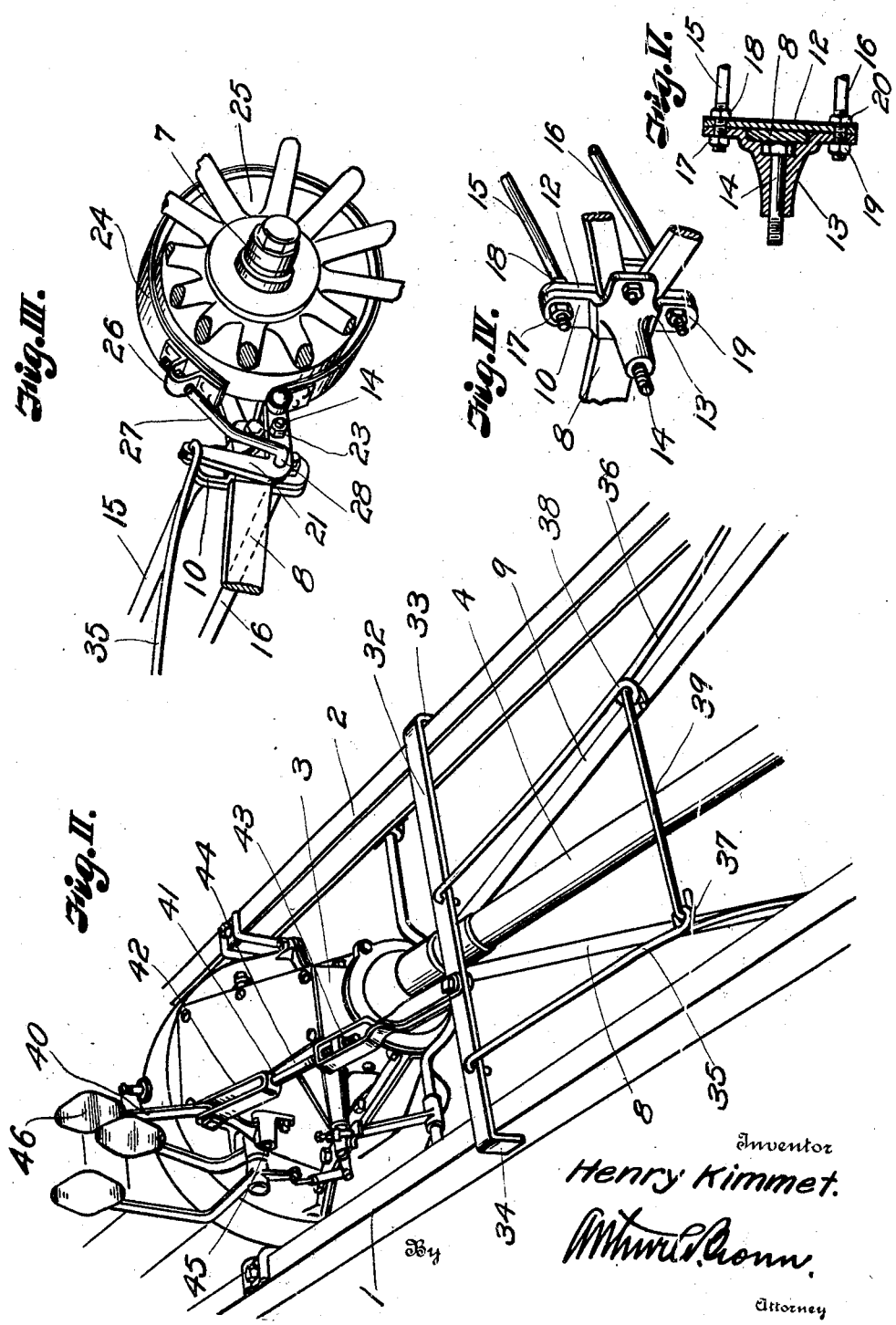

HENRY KIMMET, OF KANSAS CITY, MISSOURI, ASSIGNOR TO THE LIBERTY MANUFACTURING & SALES COMPANY, OF KANSAS CITY, MISSOURI, A CORPORATION OF MISSOURI.

VEHICLE-BRAKE.

1,375,706.  Specification of Letters Patent.  Patented Apr. 26, 1921.

Application filed February 11, 1919. Serial No. 276,350.

*To all whom it may concern:*

Be it known that I, HENRY KIMMET, a citizen of the United States, residing at Kansas City, in the county of Jackson and State of Missouri, have invented certain new and useful Improvements in Vehicle-Brakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to motor vehicle brakes and particularly to a service brake which may be readily applied to an existing type of motor vehicles as an attachment without materially altering the chassis of the vehicle and which may, if desired, be applied as an augmenting medium to take part of the braking load of the brake furnished by the manufacturer as part of the standard equipment of the vehicle.

While the braking mechanism is adapted to be built in as part of the original equipment of the motor vehicle, it is not especially designed for this purpose but is primarily intended to be substituted for those service braking mechanisms which operate through the transmission. For example, the ordinary Ford transmission is provided with a brake band adapted to retard the rotation of the drive shaft of the transmission; that is, the braking force is transmitted through the drive shaft adjacent to the engine, through the transmission and to the rear wheels. In actual practice, it has been found that the application of such a brake to a heavily loaded truck on a down grade causes the entire inertia of the load to be applied through the transmission so that parts of the transmission are subjected to severe shocks and wrenching strains causing "chatter" and otherwise deteriorately affecting the transmission.

My invention contemplates the provision of means whereby a more effective braking force may be provided, especially for heavily loaded trucks, the means being conveniently under the control of the driver and without the attendant disadvantages above enumerated.

For the purpose of illustration I have shown the invention applied to the chassis and transmission of a Ford motor vehicle although it is not necessarily limited to any particular make of vehicle.

In the drawings,—

Figure I is a top plan view of a motor vehicle chassis to which my invention is applied.

Fig. II is a detail perspective view of the front end of the transmission.

Fig. III is a detail perspective view of one of the brake bands and the operating levers therefor, showing the manner of attaching the latter to one of the radius rods.

Fig. IV is a detail perspective view of one of the brake clamps for the radius rods, and Fig. V is a cross sectional view through one of the brake clamps, the brake lever support and one of the radius rods.

Referring now to the drawings by numerals of reference:

1 and 2 designate the side bars of the chassis frame to which is connected the transmission housing or cover 3 through which the usual drive shaft 4 projects and which, through the differential 5, transmits power to the rear drive wheels 6 and 7. 8 and 9 are the radius rods of usual construction and fast on the radius rods are clamps 10 and 11, the detail construction of which is best shown in Figs. IV and V. Each clamp consists of a bar 12 adapted to rest against one side of a radius rod as a complementary clamping member to the bracket member 13, which carries a bolt or stud 14, the two clamping members being fastened together by the connecting rods 15 and 16 which extend entirely across the vehicle and are provided at their respective ends by clamping nuts 17 and 18 for the member 15, and 19 and 20 for the rod 16. On the bolts or studs 14 are fastened elbow levers 21 and 22 and secured thereto by the nuts 23 whereby they may rock on said bolts or studs as their fulcrums. The elbow levers are each connected at their rear horizontal ends to a brake band 24 which extends around the brake drums and which are provided with threaded off-sets 26 to receive the threaded connecting links 27, which are adjustably connected thereto, the links 27 having inwardly projecting ends 28 to engage the levers 21 and 22 by passing through recesses or openings therein, as best shown in Fig. III.

Therefore, it will be seen that when the vertical arms of the elbow levers are rocked forwardly, the two ends of the brake bands will be drawn together to bind against the brake drums 25. The brake bands are provided with spring spacing members 29 which consist of bracket members 30 fastened to the axle and secured to the brake bands as at 31 so that the springs will have a normal tendency to hold the bands away from the drums and prevent rattling or "chattering" of the brakes when the brakes are not applied. These springs, however, are of such construction that they permit the bands to be drawn tightly against the drums upon application of the brakes.

Normally resting upon the side bars of the chassis and bridging the same is a transversely arranged equalizing bar 32, preferably positioned forwardly of the frame adjacent to the transmission housing or cover and the bar 32 is provided with downwardly projecting ends 33 and 34 which overlie the sides of the bars 1 and 2 so as to position in proper relation thereto, the equalizing bar is connected to the vertical members of the brake levers 21 and 22 by rearwardly diverging pull rods 35 and 36, these rods lying in a plane above the radius rods and they are preferably provided intermediate their ends with eyes or loops 37 and 38 to receive the ends of a tie-rod or connecting link 39 so that liability of spreading will be avoided. The equalizing bar 32 is connected to the foot lever 40 of the standard service brake by a linked connection 41 consisting of the members 42 and 43 connected by the take-up rod 44 so that the proper adjustment may be made for the brake. The service brake lever 40, as is well known, is journaled on a suitable shaft 45 which extends within the transmission cover and which is provided with a retracting spring so that when the pressure is released from the pedal 46, the foot lever 40 will be retracted rearwardly to permit the brakes to be released.

When the parts are assembled and it is desired to apply the brakes, power can be applied to the pedal 46 to move the lever 40 in a forward direction and thereby effect a forward pull on the upstanding ends of the levers 21 and 22 so as to bring the brake bands together in opposition to the springs 29, thereby applying a direct braking power upon the exterior of the brake drums of the respective rear wheels in equal proportion so as to retard the forward motion of the vehicle without straining any of the parts of the transmission.

From the foregoing it is obvious that the brake mechanism constituting part of my invention may be attached to a known type of vehicle without even disturbing the braking mechanism which is part of the transmission but it is also obvious that, if desired, the brake in the transmission cover may be rendered ineffective and the entire braking force can take place on the rear wheels. As heretofore explained, the invention primarily contemplates the provision of means of applying an auxiliary brake or a substitute brake to a known type of vehicle but it is obvious that the brake may be built into the mechanism as a part of the standard equipment thereof, if desired.

Having thus described my invention, what I claim as new therein, and desire to secure by Letters Patent is:

1. In a braking mechanism for attachment to motor vehicles, radius rod engaging brackets consisting of spaced plates to engage opposite sides of the respective radius rods, transversely extending tie bars connecting said brackets, spindles on said brackets, brake actuating levers carried by the spindles, and means for actuating said levers.

2. In combination with a truck having a pair of brake drums and forked radius rods, a pair of fittings secured to the forked portion of each radius rod, an arm projecting from one of each pair of fittings, a crank fulcrumed upon each arm, brake bands extending around the drums and pivoted at one end to the respective cranks at one side of the fulcrum, adjuster rods adjustably connected to opposite ends of the brake bands and operably connected to the respective cranks at the opposite side of the fulcrums, and means for actuating said cranks to cause the brake bands to contract about the brake drums.

3. In combination with a truck having a pair of brake drums and forked radius rods, a pair of fittings engaging opposite sides of the forked portion of each radius rod, a bolt to hold each pair of fittings on the fork, stay rods supported by and connecting the two pairs of fittings, a crank fulcrumed upon one of each pair of fittings, brake bands extending around the drums and pivoted at one end to the respective cranks at one side of the fulcrums, adjuster rods adjustably connected to opposite ends of the brake bands and operably connected to the respective cranks at the opposite side of the fulcrums, and means for actuating said cranks to cause the brake bands to contract about the brake drums.

4. In combination with a vehicle having a pair of brake drums and forked radius rods, a pair of fittings engaging the opposite sides of the forked portion of each radius rod, shoulders on one of each pair of fittings to engage the upper and lower edges of the associated fork, an element passing through the crotch of each fork to clamp the associated fittings in place, a pair of stay rods secured to the upper and lower ends of the fittings in place, an arm projecting from one of each pair of fittings, a crank fulcrumed upon each arm, brake bands extending around the drums and pivoted at one end to the respective cranks at one side of the fulcrums, adjuster rods adjustably connected to opposite ends of the brake bands and operably connected to the respective cranks at the opposite sides of the fulcrums, and means for actuating said cranks to cause the brake bands to contract about the brake drums.

In testimony whereof I affix my signature.

HENRY KIMMET.